Nov. 22, 1960 J. M. SHUBIN 2,961,105
REFUSE VEHICLE AND LOADING APPARATUS THEREFOR
Filed June 23, 1958 3 Sheets-Sheet 3
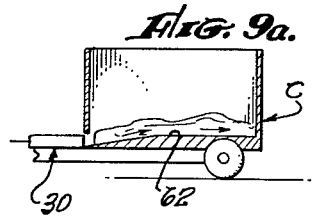
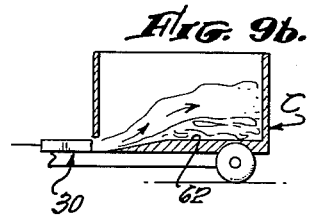
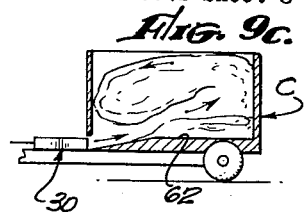
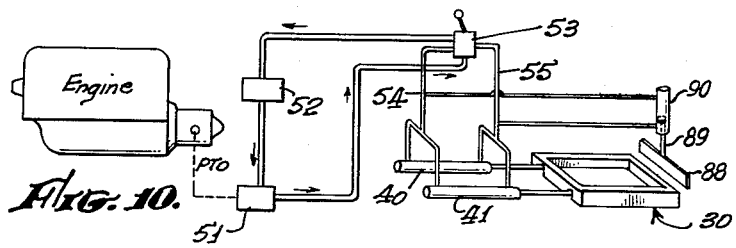
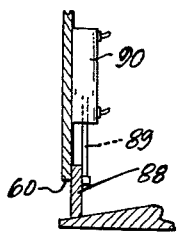
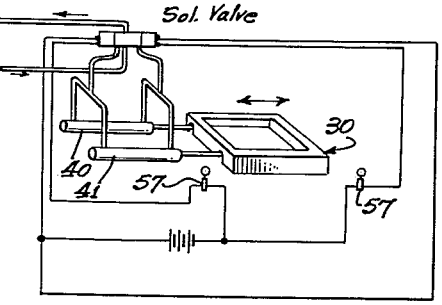
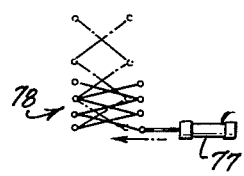
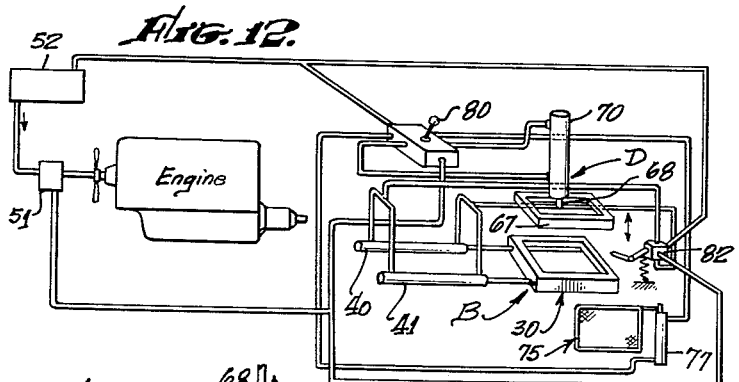
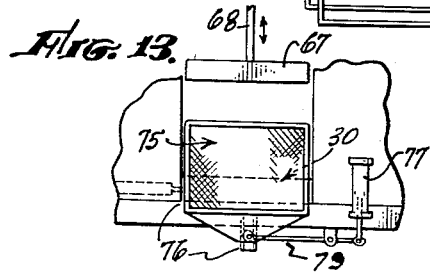
JOHN M. SHUBIN
INVENTOR.
BY William R. Spensley
ATTORNEYS.

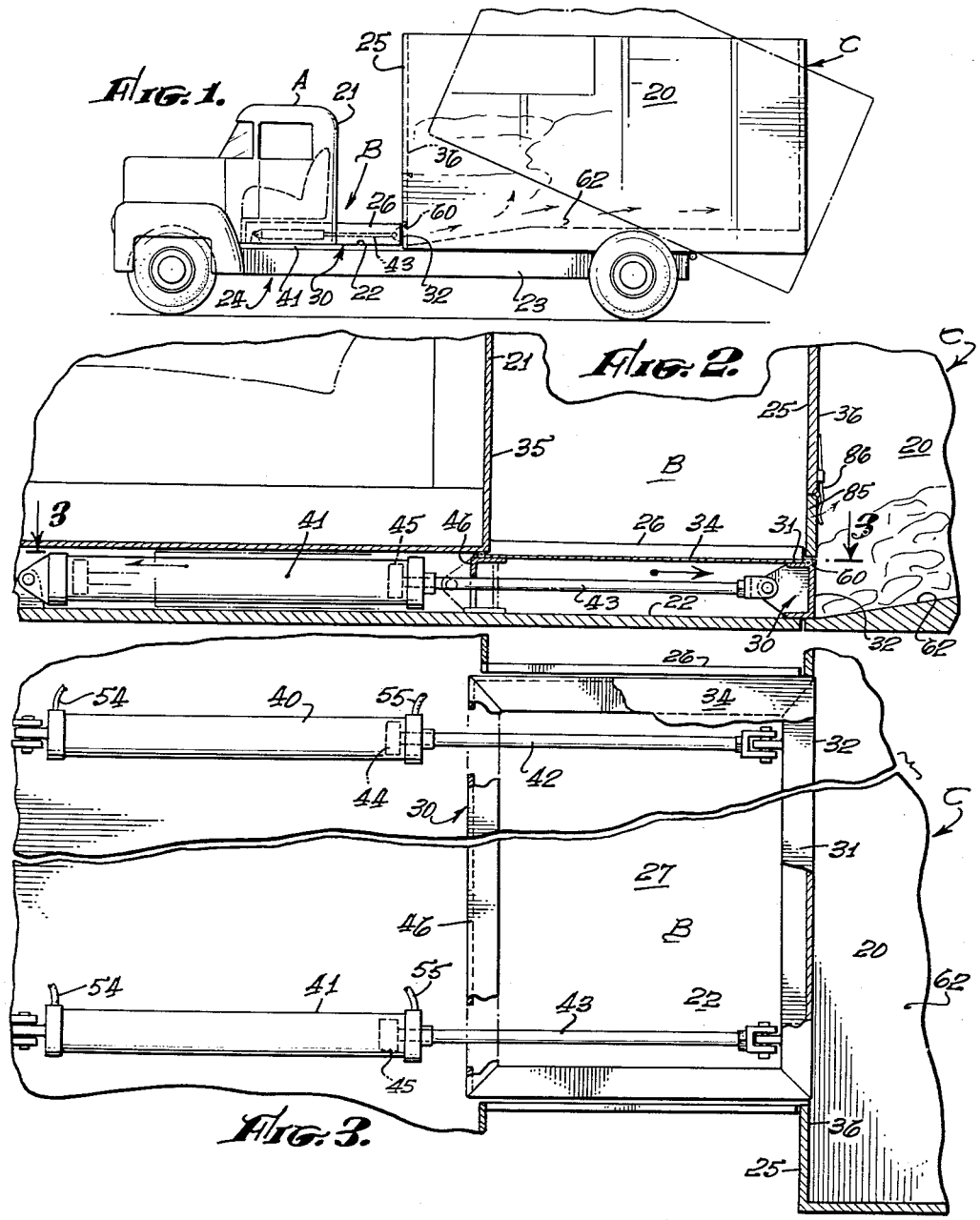

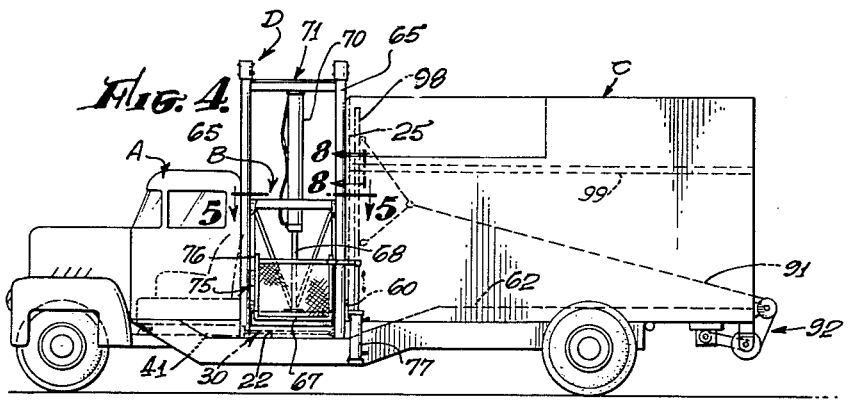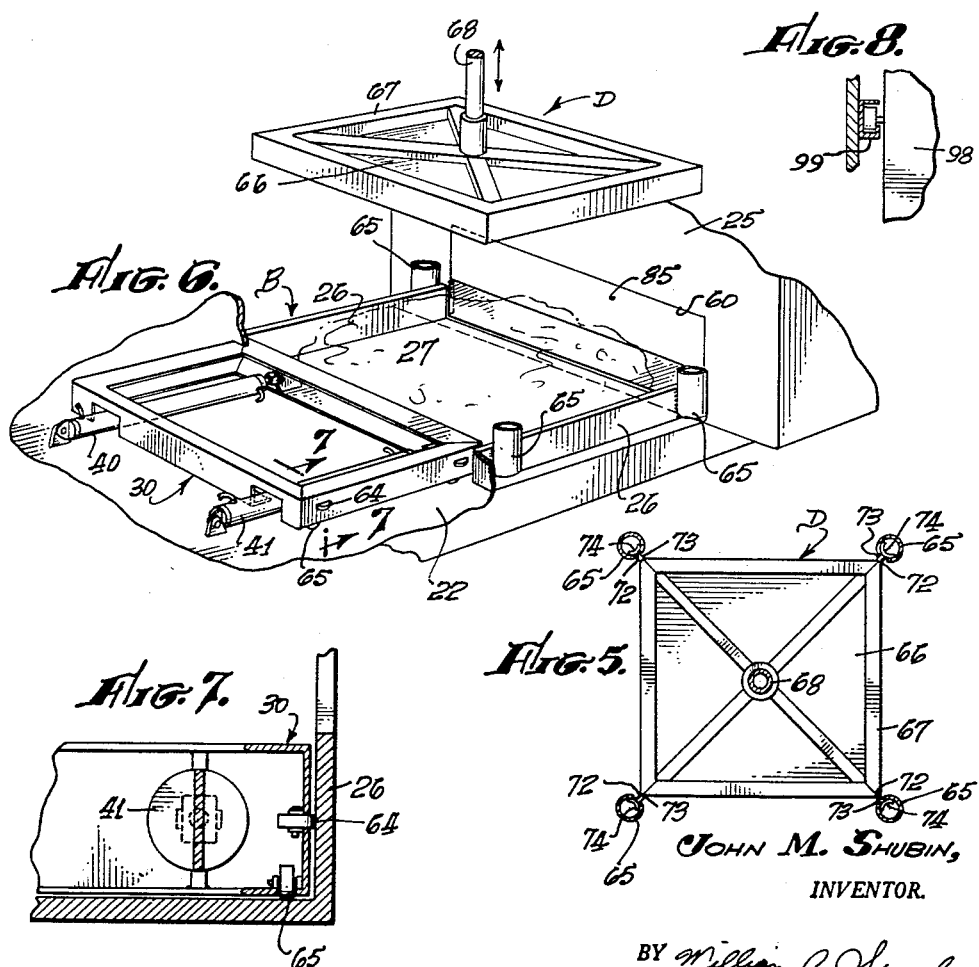

United States Patent Office 2,961,105
Patented Nov. 22, 1960

2,961,105

REFUSE VEHICLE AND LOADING APPARATUS THEREFOR

John M. Shubin, 2125 S. Patton Ave., San Pedro, Calif., assignor of fifty percent to Peter S. Shubin, Downey, Calif.

Filed June 23, 1958, Ser. No. 743,779

11 Claims. (Cl. 214—83.3)

This invention relates to refuse collecting and disposal vehicles and more particularly to an improved means for loading such vehicles.

In prior methods of collect'ng refuse it has been a common practice to load and haul trash in a loose condition within the tank body of a refuse truck. That is, the trash is most commonly emptied from the household containers into the truck tank although various expedients have been used for lifting or transporting the trash from the ground to the tank. Since trash thrown loosely into the truck tank has a low spec'fic gravity, large truck bodies are required and the collection is inefficient due to the relatively low weight load which is carried. In addition, the loose condition of the refuse causes inefficient unloading and util'zation of the dumping area. For these and other reasons some attempts have been made to compress the refuse in the tank of the truck, however, the methods and means of the prior art have not been completely satisfactory due to various disadvantages encountered in the various methods. For example, the use of a hydraulic press upon the trash deposited in the tank causes heavy stress loads upon localized areas of the tank requiring it to be of heavy reinforced construct'on. In general, it has also been found that prior art means do not allow full utilization of the volume of the tank.

Accordingly, it is an object of the present invention to provide an apparatus for refuse carrying vehicles which allows compression of refuse and utilization of the full volume of the carrying tank of the vehicle.

It is another object of the present invention to provide a refuse carrying vehicle with loading means for compressing the refuse in the tank of the vehicle.

A further object of the present invention is to provide a refuse carrying vehicle with loading means therefor by which the trash is caused to flow into the tank and to the area of least res'stance within the tank to cause full loading of the tank volume.

It is a further object of the present invention to provide a refuse tank loading means into which the refuse can be easily and quickly loaded by an operator.

A further object of the present invention is to provide a refuse carrying vehicle and loading apparatus therefor in which the refuse is compressed without causing undue stress upon the walls of the tank such that the tank can be of relatively light construction.

Yet another object is to provide means in combination with a refuse carrying vehicle by which a heavy weight load of refuse can be loaded into the vehicle.

It is a further object to provide a refuse carrying vehicle which can be safely and efficiently loaded by an operator.

It is yet another object of the present invention to provide an improved means for unloading the refuse tank of a vehicle.

In accordance with the present invention a refuse carrying vehicle and loading means therefor are provided to cause load'ng of the refuse into the tank of the vehicle such that the flow of refuse into the tank acts as a fluid which is compressed and circulated throughout the full volume of the tank. A hydraulically operated piston moves through the loading bin into which the refuse is placed by an operator to in turn force the refuse through an opening of small area relative to the area of the forward bulkhead of the tank at the forward lower edge of the tank. The refuse is caused to move over a surface which generates a circulat'ng action to the refuse to allow its compression. The circulatory and compressing action obtained by the apparatus of the present invention is such that the refuse is caused to flow into and within the tank and to the points of least resistance therein.

The novel features wh'ch are believed to be characteristic of the present invention both as to its organization and method of operation, together with further objects and advantages thereof, will be better understood from the following description considered in connection with the accompanying draw'ng in which two embodiments of the present invention are illustrated by way of example only, and are not intended as a definition of the limits of the invention.

In the drawings:

Figure 1 is an elevational view of one embodiment of a refuse truck in accordance w'th the present invention;

Figure 2 is an enlarged partial detailed view in elevation of the loading bin, piston and loading opening in accordance with this invention;

F'gure 3 is a plan view taken along line 3—3 of Figure 2;

Figure 4 is an elevational view of a second embodiment of a refuse truck in accordance with this invention;

Figure 5 is a partial plan view taken along line 5—5 of Figure 4;

Figure 6 is an enlarged part'al view in perspective of the refuse loading section of the truck of Figure 4;

Figure 7 is a partial view taken along line 7—7 of Figure 6;

Figure 8 is a partial view taken along line 8—8 of Figure 4;

Figure 9 is a schematic view of the truck tank showing in Figures 9a, 9b, and 9c three views of the tank during succeeding stages of loading in accordance with this invention;

Figure 10 is a schematic view of one form of hydraulic system for actuating the loading piston;

Figure 11 is an alternative form of hydraulic system for actuating the loading piston;

Figure 12 is a schematic view of an hydraulic system for actuating the moving elements of the embodiment shown in Figures 4 through 8;

Figure 13 is a partial view in schematic showing a safety side gate of Figure 4;

Figure 14 is a partial view of an alternative operating mechanism for the safety side gate of Figure 13; and Figure 15 is a partial view of a check gate for the trash opening into the tank.

Referring now to the drawings and particularly to Figures 1, 2 and 3, there is shown one embodiment of the present invention as applied to a refuse carrying truck of the rear dumping type. In general, the truck includes a cab section A, a refuse loading section B and a tank section C into which the trash is loaded. As shown particularly in Figures 1 and 2 the tank 20 is spaced rearwardly of the back wall 21 of the cab A by a distance sufficient to define the refuse loading section B. A bottom plate 22 which serves as the floor of the loading bin is positioned upon and spans the channels 23 of the truck chassis 24. The width of the plate 23 defines the width of the loading bin, which is approximately equal to the width of the chassis, while the plate extends from the forward bulkhead 25 of the tank 20 to a position beneath the cab section A.

A loading piston 30 of predetermined height, as defined hereinafter, is slidably mounted upon the plate for movement forward and rearward between the side walls 26 of the loading bin 27. In the embodiment shown, the piston comprises a rectangular frame slightly smaller in width than the distance between the sidewalls 26 of the bin and slightly greater in length than the distance between the tank bulkhead 25 and the rear wall 21 of the cab A. The rearward side of the piston is formed of a channel 31 with the flat face 32 of the channel forming the face of the piston. The piston face is thus substantially vertical and is of a predetermined height as discussed hereinafter. The remaining three sides of the frame are also formed of channels in this embodiment and a cover plate 34 is affixed over the frame to prevent entrance of trash into the frame of the piston.

Means are provided for reciprocating the piston from the forward position shown in phantom in Figure 2, at which the piston face 32 is substantially at the rear wall 21 of the cab, to the rearward position shown in Figures 2 and 3 at which the piston face is approximately coincident with the rear surface 36 of the tank bulkhead 25. In this embodiment a pair of hydraulically operated cylinders are utilized to achieve the sliding movement of the piston. Thus, a first cylinder 40 and a second cylinder 41 are mounted forward of the loading bin in the cab section A. The cylinders are mounted horizontally beneath the seat of the cab and are affixed to the plate 22 or chassis of the truck. Connecting rods 42 and 43 which are affixed to cylinder pistons 44 and 45 in the respective cylinders are connected at their exterior end to the piston 30 by connecting the rods 42, and 43 to the channel 31. The hydraulic cylinders are of the type well known to the art in which the piston is caused to travel in the desired direction by appropriate valving which admits fluid under pressure to the side of the piston 44 and 45 opposite the direction in which the piston is to be moved. It should be noted that the rear channel 46 of the piston 30 is broken or otherwise provided with openings which allow the piston 30 to travel over the cylinders 40 and 41 to its retracted or forward position. As shown schematically in Figure 10, the actuating and hydraulic system for the piston includes, for example, an hydraulic pump 51 which is operated by a power take off from the truck engine. Fluid under pressure is pumped through the high pressure line of the system to a two way selector valve 53. The selector valve is of the well known type which transmits the high pressure fluid to loading line 54 at the forward side of the cylinders or the retraction line 55 at the rearward end of the pistons. Thus, when the valve is moved in one direction the piston 30 is caused to move rearward and when the valve is moved in the other direction the piston 30 is caused to be retracted, i.e., moved in the forward direction. A similar hydraulic system is shown in Figure 11 but is adapted to be actuated by electric switches 57 which cause the solenoid actuated selector valve to be moved for movement of the piston 30 in the desired direction.

A loading opening 60 is provided through the forward bulkhead 25 of the tank 20. The opening is substantially equal to but greater in height and width than the face 32 of the piston 30. That is, the height of the side wall 26, the piston 30 and the loading opening 60 are interdependent and are determined such that the height of the loading opening is relatively small in relation to the height of the tank. For example, in the embodiment shown the height of the tank and the forward bulkhead is nine feet, while the height of the opening is twelve inches. It is the relatively small size of the opening which permits flow of the trash into the tank and compression of the trash in accordance with this invention. The side walls 26 of the loading bin are preferably slightly higher than the height of the piston to provide confinement of the trash as it is pushed by the piston. In connection with such flowing motion the bed 62 of the tank is upwardly and rearwardly inclined along a portion of its length extending from the forward bulkhead. Therefore, as shown in Figure 9, trash pushed through the opening 60 by the piston 30 enters in a small area and progresses rearward and upward as shown in Figures 9a and 9b. As the tank fills with trash the flow of the trash in the tank, as shown by the arrows in 9c, is circulatory. The trash under the action of the small volume of trash forced in and up one lower corner of the tank may be said in effect to be caused to "boil." The trash in circulating moves to the unoccupied portion of the trash volume as the points of least resistance and will move to the roof of the tank and the upper corners of the truck tank. Thus, under the circulatory and compressive action caused by the loading in accordance with this invention the complete volume of the tank is filled with trash which has been compressed.

Thus, in the operation of this embodiment the selector valve is moved to the retract position at which fluid under pressure forces the cylinder piston 44 forward, i.e., from right to left in Figures 2 and 3, to the position shown in phantom in Figure 2. At this position the piston face 32 is substantially coincident with the rear wall 21 of the cab section A. An operator then deposits trash in the loading bin between the side walls 26, rear wall 21 of the cab and forward bulkhead 25 of the tank. After the loading bin is filled the selector valve 53 is moved to the load position and fluid under pressure is transmitted to the left side of the cylinder piston 44 to move the cylinder pistons 44 and the loading piston 30 rearward thus forcing the trash in the bin through the loading opening 60 and into the tank as described hereinbefore. Since the piston is covered by a cover plate 34 the operation can be continuous. That is, the piston 30 is cycled from the forward to the rearward position continuously while the trash is also loaded in the bin continuously. Since the piston 30 is somewhat longer than the length of its stroke the rear edge of the piston never extends into the loading bin and trash can only fall between the piston face 32 and the loading opening 60.

Referring now to Figures 4 through 8 and 12 through 14, further details of construction and operation will be discussed in connection with a second embodiment of the present invention utilizing a closed loading section. Referring to Figures 4, 6 and 7 the loading bin section of the embodiment of Figure 4 is shown in detail. In this embodiment the section of the truck chassis beneath loading section B is lowered such that the floor plate 22 of the loading bin is positioned nearer the ground level. This lowering of the bin facilitates loading of the loose trash into the bin by the operator. In this embodiment the piston 30 and hydraulic cylinders 40 and 41 are constructed and mounted as previously described in connection with the first embodiment with the exception that guide rollers 64 and 65 are rotatably mounted upon the side channels of the piston on both the vertical and horizontal faces of the channel. The rollers on the horizontal face are in rolling contact with the floor plate 22 while the rollers on the vertical face are in rolling contact with the side plates 26 to insure ease of reciprocation of the piston 30. The side walls 26 of the loading bin are substantially equal in height to the face 32 of the piston and the loading opening 60 again corresponds in area to the cross-sectional area of the piston face, being slightly larger in height and width to allow the face of the piston to progress slightly beyond the forward face of the bulkhead. In this embodiment it is not necessary that a cover plate be used over the frame of the piston since a closure assembly D is used as described hereinafter. The area of the loading opening 60 is again small relative to the size of the bulkhead 25 to achieve the circulatory flow and compression and the bed 62 of the tank is upwardly inclined away from the opening 60.

As shown in Figures 4, 5 and 6, a vertically reciprocable closure assembly D is used to form what is in effect a closed bin or conduit through which the trash is pushed to the tank by the piston 30. Thus, in the embodiment shown, four tubular vertical columns 65 are mounted proximate each corner of the loading bin 27. The columns form a mounting means and guide for a vertically reciprocable closure plate 66 which is affixed to the lower surface of an appropriate mounting frame 67. The frame 67 serves to make the plate rigid and also as a means for mounting the plate 66 on the columns and the connecting rod 68 of a vertically disposed hydraulic cylinder 70. The hydraulic cylinder is mounted proximate the upper ends of the columns 65 by means of suitable stationary framing 71 connected between the columns. The upper end of the cylinder 70 is then affixed by means of the framing substantially at the center point of the loading bin 27. The hydraulic cylinder 70 is of the type well known to the art described hereinafter.

A piston is slidably movable within the cylinder in response to hydraulic pressure created at either side of the piston. The connecting rod 68 extends from the lower end of the cylinder and is affixed to the frame 67 of closure plate 66. The cylinder has an operating stroke and is so oriented with respect to the loading bin 27 that at the lower extremity of the operating stroke of the cylinder the frame 67 is at the vertical position shown in Figure 4 at which the closure plate 66 is adjacent to the upper edge of the side walls 26. At the upper extremity of the operating stroke of the cylinder 70 the closure plate 66 is raised a sufficient distance above the side walls of the loading bin 27 to allow easy access to the loading bin by the operator who is loading the bin. Thus, when the closure plate 66 is moved downward to its lowermost position the loading bin is completely enclosed and trash contained in the bin is forced rearward by the rearward movement of the piston 30 and into the truck tank through the loading opening 60. Referring to Figure 5, in this embodiment the frame 67 of the closure plate 66 is mounted upon the columns 65 for vertical movement with respect thereto by providing vertically extending slots 72 in the columns through which guide members 73, which are affixed at each corner of the frame, extending radially from the frame, project. To maintain the guide members in sliding engagement with the columns an arcuate segment 74 having a radius slightly less than the inside radius of the tubular columns is affixed to each guide member.

In addition to the closure assembly D there is utilized in this embodiment a safety side gate 75 operable in combination with the closure assembly, which will retain trash in the loading bin during the downward stroke of the closure assembly and which also acts as a safety device for the operator of the truck. Thus, as shown in Figure 13, there is provided a safety side gate 75 at each side of the loading bin which is vertically movable from a downward position at which the upper edge of the gate is substantially at, or slightly below, the upper edge of the side walls 26 of the loading bin to an upper position at which the upper edge of the side gate is substantially at a height corresponding to the upper position of the closure plate 66. The side gates 75 are formed of rectangular plates which are mounted for vertical sliding movement in channels 76 affixed proximate the columns 65 at each side of the loading bin. Vertical movement of the side gates is obtained by means of an hydraulic cylinder 77 positioned proximate each of the side gates. The hydraulic cylinders 77 are vertically oriented and are affixed to the truck chassis with the connecting rod of the cylinder extending from the lower end of the cylinder. The connecting rod is pivotally affixed to a pivoted lever arm 79 which in turn raises and lowers the side gate. As shown in Figure 14 where insufficient space is available for the required vertical movement of the connecting rod the cylinder may be oriented as shown in Figure 14 with the connecting rod extending toward one edge of the side gate. A pantograph linkage 78 is connected between the connecting rod and the side plate such that a relatively small horizontal stroke of the piston 77 imparts a multiplied vertical movement to the side plate, which movement is sufficient to move the side plate from the upper to the lower position as defined hereinbefore.

Referring now to Figure 12, an illustrative hydraulic actuating system for sequentially operating the loading cycle of the loading section as shown in Figure 4 is illustrated. It should be noted that the hydraulic actuating system is so constructed that upon actuation of a switch or valve by the operator the sequence of operation of the mechanisms is such that the safety side gates move upward, the closure plate assembly moves downward to its lowermost position after which the piston moves from the forward to the rearward position. Thus, in the illustrative hydraulic system a high pressure hydraulic pump is connected by a power takeoff to the truck engine and pumps fluid under pressure to the two way selector valve 80 which is of the type described hereinbefore in connection with the first embodiment. In this illustrative system two such valves are used in order that the mechanism can be sequentially operated. The first valve 80 controls the operation of the closure assembly 63 and the safety side gates 75 and admits fluid under pressure to the actuating side of the hydraulic cylinders 70 of the closure assembly and the hydraulic cylinders 77 for each of the safety side gates. Thus, the high pressure line extends to each of the valves 80 and 82. Upon actuation of the first valve 80 high pressure fluid is admitted to the lower side of the hydraulic cylinder 77 and the safety gate is moved to its uppermost position. Simultaneously, the high pressure fluid is conducted to the upper side of the cylinder 70 to cause the closure plate 66 to be moved downward to its lowermost position at which it is proximate the upper edges of the side walls 26 of the loading bin 27. The second valve 82 is then actuated to admit high pressure fluid to the forward side of the cylinders 40 and 41 causing the piston 30 to be moved rearward and to force trash contained in the closed bin through the loading door 60 and into the tank 20. The second valve 82 is actuated by means of the movement of the closure plate 66 as it approaches its lowermost position. That is, in this embodiment a spring loaded lever which actuates the valve from the position, at which fluid causes the loading piston 30 to be retracted, to the position at which fluid causes the loading piston to move through the bin 27, is positioned beneath one edge of the closure plate 66 such that the closure plate 66 moves the valve lever to the loading position when the closure plate 66 approaches its lowermost position. Thus, manual operation of the first valve 80 causes the proper sequence of loading operation in that the closure plate descends and at the same time the safety side gates ascend, after which the loading piston 30 moves through the loading bin 27. Conversely, retraction of each of the three mechanisms to the positions at which the bin is to be reloaded is accomplished by reversing the position of the first actuating valve 80 since the second valve 82 is spring loaded to move to the retract position as the closure plate rises. It may be seen that a solenoid operated valve such as that shown and described in connection with Figure 11 can be used to actuate each of the mechanisms in the proper sequence.

Referring now to Figures 1, 2 and 6 a pivotable door 85 is shown as forming the upper edge of the loading opening 60. The oversize door 85 forms the lowermost part of the forward bulkhead above the opening 60 and is provided to accommodate the admission of trash into the tank which may be too large to enter through the opening 60. The door 85 is pivoted at its upper edge for swinging movement into the tank and is spring loaded, for example, by leaf springs 86 to the closed position as shown in Figure 2 at which it is coincident with the forward bulkhead. In some applications where high compression of the trash load in the tank is necessary or desirable, it is advantageous to utilize a vertically movable closure for the opening 60 which operates much in the manner of a check valve in connection with this invention where an effect of flow of the trash is achieved. Thus, as shown in Figures 10 and 15 is vertically movable plate 88 having a width substantially equal to the width of the opening 60 and a height slightly greater than the opening is mounted in vertical channels for vertical movement between a downward position at which the lower edge of the check plate 88 is adjacent the floor of the tank to an upward position which at the lower edge of the plate is proximate the upper edge of the opening 60. The channels and the check plate are positioned adjacent the inner surface of the forward bulkhead and an actuating hydraulic cylinder 90 is mounted in the tank and connected to the plate to accomplish the vertical movement thereof. In the embodiment shown the cylinder 90 is affixed to the inner surface of the bulkhead and is vertically disposed with the connecting rod 89 extending from the lower end thereof and connected to the check plate with a stroke sufficient to move the plate from the upper to the lower position. Thus, when a check plate is used it is connected into the hydraulic system as previously described such that it is actuated to the downward position when the piston commences its rearward stroke and is returned to its upward position when the piston begins to retract.

The operation of a trash loading vehicle constructed in accordance with the present invention will be apparent to those skilled in the art from the foregoing description. However, to summarize such operation in connection with the embodiment shown in Figure 4 in the bin loading position of the truck the piston 30 is in its retracted position at which it forms the forward side of the loading bin 27. The closure plate is in the upper position, and the safety gates 75 are in the downward position. When a check plate 88 is used such check plate is in the upward position. The trash is then loaded by the operator into the trash loading bin 27 between the forward bulkhead and the rear wall of the cab section B and between the side plates 26 of the loading bin. When the loading bin is filled the loading mechanisms are actuated causing the safety gates to move upward and the closure plate 66 to move downward. As the closure plate 66 moves downward it compresses any trash which extends above the upper edge of the side walls 26 and forms in effect a closed conduit defined by the side walls 26, the floor plate 22 and the closure plate 66. The piston 30 is then actuated and moves rearward through the conduit pushing the trash rearward through the tank opening 60. In the embodiment where a check plate is used the check plate is raised simultaneously with the commencement of the rearward movement of the piston 30. As the piston 30 moves rearward forcing the trash through the opening 60 and into the tank 20 the upward inclination of the tank bed, together with the compressing action of the trash being admitted to the tank at the side lower corner thereof causes a boiling circulatory movement of the trash within the tank and a compressive action upon the trash. Thus, a much greater weight load of trash is pressed in the tank and the tank is completely filled with trash in a compressed condition. To unload the tank in the embodiment shown in Figure 1 the tank is merely dumped by the well known expedient of pivoting the tank. In the embodiment shown in Figure 4 an unloading mechanism is provided by which an unloading plate 98 normally positioned adjacent the forward bulkhead and supported by rollers in horizontal channels 99 is caused to move rearward by cables 91 attached thereto which are pulled rearward by a motor actuated pulling mechanism 92 as shown in Figure 4.

Thus, the present invention provides an improved trash carrying vehicle and loading means therefor which allows the tank of the vehicle to be filled to its full volume with compressed trash. By means of the loading apparatus of the present invention and its manner of operation, trash loaded into the tank of the vehicle by the loading piston moving through the loading bin is compressed and circulated throughout the tank much in the manner of fluid flow. The trash moves to the roof of the tank and fills all corners thereof due to its flow to the points of least resistance within the tank. It has been found that trash loaded by means of the apparatus of the present invention is compressed sufficiently that its weight per volume is comparable to that of trash which has been baled. Thus, the weight of trash loaded into the tank of the vehicle is of the order of 4 or 5 times that of trash which has been loosely loaded.

What is claimed is:

1. A vehicle for carrying compressible trash comprising: a cab section; a loading section; a tank section; said tank section including a closed tank having a generally planar forward bulkhead and a bottom plate having a longitudinal portion thereof extending upwardly and rearwardly from the forward lower edge of said tank, said forward bulkhead defining a generally rectangular opening at the lower edge thereof; said loading section extending between said forward bulkhead and a rear wall of said cab section, said loading section including a loading bin defined by a substantially horizontal bottom plate and vertical side plates positioned parallel to the longitudinal axis of the vehicle at opposed sides of said bottom plate; a reciprocable piston having a rearward face movable through said loading bin from a position proximate said rear wall of said cab to a position proximate said bulkhead, said rearward face of said piston being mateable with said opening, said piston face and said opening having a height relatively small in relation to the height of said bulkhead; hydraulic means for reciprocating said piston; a vertically movable closure plate positioned above said loading bin, said vertically movable plate being substantially equal in length and width to the length and width of said loading bin; means for moving said vertically movable plate downward to a position proximate the upper edge of said side plates whereby said loading bin is a closed conduit through which said piston is moved; first and second safety side gates mounted upon said loading bin proximate and substantially parallel to said side plates, said side gates being vertically movable from a first position at which the upper edges thereof are in substantially the same plane as the upper edges of said side plates to a second position at which said side gates form an upward extension of said side plates, and hydraulic means for moving said side gates upward as said closure plate moves downward.

2. The apparatus as defined in claim 1 which also includes a check gate for said rectangular opening, said check gate being substantially greater in cross-sectional configuration than said opening and positioned proximate and substantially parallel to said forward bulkhead at the inner side thereof, said check gate being vertically movable, means for moving said check gate from an upper position at which the lower edge of said check gate is above said opening to a lower position at which said check gate closes said opening.

3. The apparatus as defined in claim 1 in which the means for moving the closure plate, piston, and side gates includes a first hydraulic cylinder affixed between said piston and a stationary base of said vehicle for horizontal reciprocation of said piston, a second hydraulic cylinder affixed between said vertically movable plate and a stationary base of said vehicle for vertical reciprocation of said closure plate, a third and fourth hydraulic cylinder affixed between said first and second side gates respectively and a stationary base of said vehicle for vertical reciprocation of said side gates and hydraulic actuating means for sequentially actuating said closure plate to the downward position thereof and said side gates to the second position thereof after which said piston is moved from the forward to the rearward position thereof.

4. An apparatus for loading compressible material into a closed material carrying tank mounted upon a vehicle chassis, said tank having a substantially planar forward bulkhead provided with an opening at the lower edge thereof, said opening being of small area relative to the area of said forward bulkhead, comprising: a loading bin positioned forward of the forward bulkhead of said tank, said loading bin being defined by a bottom wall, opposed side walls extending forwardly from the lower portion of said tank and a forward wall opposite said bulkhead; a horizontally arranged reciprocable piston at the bottom of said loading bin, said piston having an upper horizontal material receiving surface to support material deposited in the bin during the forward travel of the piston through the bin and said piston having a material engaging face, said piston being movable through said loading bin from the forward end thereof to a position proximate said bulkhead, said face of said piston being aligned with the opening of the forward bulkhead of the tank.

5. The invention defined by claim 4, wherein the piston material engaging face has relatively small height compared to its width.

6. An apparatus for loading compressible material into a closed material carrying tank mounted upon a vehicle chassis, said tank having a substantially planar forward bulkhead provided with an inlet opening at the lower edge thereof, said opening being of small area relative to the area of said forward bulkhead, comprising: a loading bin positioned forward of the forward bulkhead of said tank, said loading bin being defined by a bottom plate, opposed side plates extending forwardly from the lower portion of said tank and a forward wall opposite said bulkhead, said forward wall having a transverse opening thereacross and at the bottom thereof; a reciprocable piston at the bottom of the bin having an upper horizontal material receiving surface to support material deposited in the bin during the forward travel of the piston through the bin, said piston having a material engaging face, said piston being movable through said transverse opening, the upper horizontal edge of said transverse opening being adjacent to the top horizontal material receiving surface of said piston, said piston also being movable through said loading bin from the forward end thereof to a position proximate said bulkhead, said face of said piston being mateable with said inlet opening.

7. An apparatus for handling compressible material, comprising: a closed material carrying tank adapted to be mounted upon a vehicle chassis, said tank including a substantially planar forward bulkhead provided with an inlet opening at the lower edge thereof, said opening being of small area relative to the area of said forward bulkhead, and a bottom having a part extending rearwardly and upwardly from said inlet opening; a loading bin positioned forward of the forward bulkhead of said tank, said loading bin being defined by a bottom wall, opposed side plates extending forwardly from the lower portion of said tank and a forward wall opposite said bulkhead, said bin having a transverse opening thereacross at the bottom thereof, a horizontally arranged reciprocable piston at the bottom of the bin having a material engaging face and an upper horizontal material receiving surface to support material deposited in the bin during the forward travel of the piston through the bin, said piston being movable horizontally through said transverse opening, the upper horizontal edge of said transverse opening being adjacent to the top surface of said piston, said piston also being movable through said loading bin from the forward end thereof to a position proximate said bulkhead, said face of said piston being aligned with said inlet opening.

8. An apparatus for loading compressible material into a closed material-carrying tank having a substantially planar bulkhead mounted upon a vehicle chassis, including: a loading bin positioned adjacent said bulkhead of said tank, said tank having an inner bottom surface extending rearwardly and upwardly from the lower edge of said opening throughout a portion of the length of said tank, said bulkhead having an opening at the lower edge thereof, said opening extending across said tank and being of small depth relative to said bulkhead, a reciprocable piston having an upper horizontal material receiving surface to support material deposited thereon during the forward travel of the piston through the bin and a material engaging flat face registrable with said opening and movable through said loading bin to a position proximate said opening to force material in front of the face of said piston into said opening, said piston and opening being substantially at the level of the bottom of said tank, and means for reciprocating said piston whereby the said material is caused to flow into the tank into the areas of least resistance generating a circulatory action over the surface of the material accumulating in the tank.

9. The apparatus of claim 8, wherein said opening has a substantially rectangular configuration having a width substantially equal to the width of said tank.

10. An apparatus for loading compressible material into a closed material-carrying tank having a substantially planar bulkhead mounted upon a vehicle chassis, including: a loading bin positioned adjacent said bulkhead of said tank said tank having an inner bottom surface extending rearwardly and upwardly from the lower edge of said opening throughout a portion of the length of said tank, said bulkhead having an opening at the lower edge thereof, said opening extending across said tank and being of small depth relative to said bulkhead, a reciprocable piston having a face registrable with said opening and movable through said loading bin to a position proximate said opening, said piston and opening being substantially at the level of the bottom of said tank, and means for reciprocating said piston whereby the said material is caused to flow into the tank generating a circulatory action over the surface of the material accumulating in the tank, including a vertically-movable closure plate positioned above said loading bin, said vertically-movable plate being substantially equal in length and width to the length and width of said loading bin, and means for moving said vertically-movable plate downward to a position proximate the upper edge of said side plates whereby said loading bin is a closed conduit through which said piston is movable.

11. The apparatus of claim 10, wherein said apparatus is embodied in a vehicle having a cab section, said loading bin being located forward of said tank between the tank and the cab section.

References Cited in the file of this patent

UNITED STATES PATENTS

| | | |
|---|---|---|
| 649,413 | Luzzatto | May 8, 1900 |
| 2,750,055 | Huffines | June 12, 1956 |